(12) United States Patent
Bridwell

(10) Patent No.: US 7,605,486 B2
(45) Date of Patent: Oct. 20, 2009

(54) FLUID POWERED GENERATOR

(75) Inventor: Randolph E. Bridwell, Sarasota, FL (US)

(73) Assignee: Aerokinetic Energy Corporation, Sarasota, FL (US)

( * ) Notice: Subject to any disclaimer, the term of this patent is extended or adjusted under 35 U.S.C. 154(b) by 0 days.

(21) Appl. No.: 12/103,006

(22) Filed: Apr. 15, 2008

(65) Prior Publication Data

US 2009/0058093 A1 Mar. 5, 2009

Related U.S. Application Data

(60) Provisional application No. 60/912,227, filed on Apr. 17, 2007.

(51) Int. Cl.
*F03D 11/00* (2006.01)
(52) U.S. Cl. .......................................... 290/43; 290/54
(58) Field of Classification Search .................. 290/43, 290/44, 54, 55; 310/233
See application file for complete search history.

(56) References Cited

U.S. PATENT DOCUMENTS

| | | | |
|---|---|---|---|
| 1,903,307 A | 4/1933 | Gillio | |
| 3,713,503 A | 1/1973 | Haan | |
| 4,002,218 A | 1/1977 | Horvat | |
| 4,075,545 A | 2/1978 | Haberer | |
| 4,179,007 A | 12/1979 | Howe | |
| 4,220,870 A | 9/1980 | Kelly | |
| 4,289,970 A * | 9/1981 | Deibert | 290/44 |
| 4,423,368 A | 12/1983 | Bussiere | |
| 4,431,959 A | 2/1984 | Remmers | |
| 4,720,640 A * | 1/1988 | Anderson et al. | 290/43 |
| 4,885,493 A | 12/1989 | Gokhale | |
| 5,287,004 A | 2/1994 | Finley | |
| 5,584,355 A | 12/1996 | Burns | |
| 5,607,329 A | 3/1997 | Cho et al. | |
| 5,619,956 A | 4/1997 | Koziara et al. | |
| 5,680,032 A | 10/1997 | Pena | |
| 5,760,515 A | 6/1998 | Burns | |
| 5,850,108 A * | 12/1998 | Bernard | 290/54 |
| 6,064,123 A * | 5/2000 | Gislason | 290/55 |
| 6,181,111 B1 | 1/2001 | Hoffman et al. | |
| 6,194,798 B1 | 2/2001 | Lopatinsky | |
| 6,278,197 B1 * | 8/2001 | Appa | 290/55 |
| 6,476,513 B1 * | 11/2002 | Gueorguiev | 290/55 |
| 6,664,655 B2 * | 12/2003 | Vann | 290/55 |
| 6,882,059 B1 | 4/2005 | DePaoli | |
| 6,921,243 B2 | 7/2005 | Canini et al. | |
| 7,132,760 B2 | 11/2006 | Becker | |
| 7,215,037 B2 | 5/2007 | Scalzi | |

(Continued)

FOREIGN PATENT DOCUMENTS

GB          2062977          5/1981

(Continued)

*Primary Examiner*—Nicholas Ponomarenko
(74) *Attorney, Agent, or Firm*—Lieberman & Brandsdorfer, LLC

(57) ABSTRACT

An integrated generator unit is provided to generate electrical energy. One or more integrated generator units are mounted in an enclosure and in communication with a battery to store electrical energy. Each unit has a plurality of rotational elements that rotate about an axis as fluid passes through the enclosure. A magnet is provided in communication with at least one end of the rotational elements and in close proximity to electrically conductive material. As the rotational element is exposed to fluid flow, fluid passes through the enclosure and causes the rotational element(s) to rotate. This rotation causes the magnet to pass by the electrically conductive material and to generate electrical energy.

35 Claims, 8 Drawing Sheets

U.S. PATENT DOCUMENTS

| | | | |
|---|---|---|---|
| 7,215,038 B2 * | 5/2007 | Bacon | 290/55 |
| 7,417,334 B2 * | 8/2008 | Uchiyama | 290/55 |
| 2004/0252495 A1 | 12/2004 | Tseng | |
| 2006/0186749 A1 | 8/2006 | Strydom | |
| 2007/0126240 A1 | 6/2007 | Richards et al. | |

FOREIGN PATENT DOCUMENTS

| | | |
|---|---|---|
| GB | 2271536 | 4/1994 |

* cited by examiner

FLUID POWERED GENERATOR

CROSS REFERENCE TO RELATED APPLICATION(S)

This is a non-provisional utility patent application claiming benefit of the filing date of U.S. provisional application Ser. No. 60/912,227 filed Apr. 17, 2007, and titled "Fluid Powered Generator", which is hereby incorporated by reference.

FIELD OF THE INVENTION

The present invention relates to an apparatus and method for generating electrical energy from a mechanical source. More specifically, the present invention generates electrical energy from a fluid source and harvests the electrical energy as a power source.

BACKGROUND

Fossil fuels are hydrocarbons, primarily in the form of coal, fuel oil, and natural gas. These fuels are formed from the remains of dead plants and animals over the course of thousands of years. As such, the supply of fuel derived from a fossil fuel source is finite. The economic principle of supply and demand suggests that as hydrocarbon supplies diminish, costs for such supply will rise. Accordingly, there is an economic incentive to seek alternative energy fuel based upon the laws of economics.

It is known in the art that combustion of fossil fuels creates air pollutants, such as nitrogen oxides, sulfur dioxides, and heavy metals. In addition, combustion of fossil fuels is known to produce radioactive materials in the form of uranium and thorium. Environmental regulation uses a variety of approaches to limit emissions. However, the best solution is an alternative energy source that mitigates or eliminates combustion of fossil fuels.

Fossil fuels in the form of refined gasoline are used to power conventional land vehicles that operate on an internal combustion engine. In recent years there has been research and development in creation of engines for land vehicles that do not require fossil fuels, or at least mitigate the quantity of fossil fuels needed to operate the vehicle. For example, a battery electric vehicle is an electric vehicle that utilizes chemical energy stored in a rechargeable battery pack. Electric vehicles use electric motors instead of, or in addition to, internal combustion engines. A formative of an electric vehicle that is becoming more common in the marketplace is a hybrid land vehicle that uses both an electric motor and an internal combustion engine. Current land vehicles that utilize motors supported by electrical energy have the limitation of requiring re-charging of the battery packs. Consumers need to be able to travel great distances with the ease that gasoline based vehicles provide. Accordingly, there is a need for a vehicle that can produce electrical energy to power its motor and facilitate travel while minimizing any adverse pollution effects on the environment.

Land vehicles powered by electricity are known to reduce direct pollution from the vehicle. Specifically, it is known that a car can be powered by a battery without the conventional generator utilized by gasoline based cars. The modification of the conventional generator creates a car that emits fewer pollutants. However, one of the limitations of both the electric powered land vehicle and the hybrid vehicle is an alternative mechanism to recharge the battery. One of the known methods and systems to generate and utilize electrical energy for recharging the battery within a vehicle is a fluid flow-powered generator. A fluid flow powered generator translates fluid flow created by a car's motion into the rotational energy of a turbine. The turbine is typically attached to a generator wherein the rotational force of the turbine applies a rotational force on the rotors of the generator. The rotation of the rotors of the generator activates the generator and allows the generator to recharge the battery while the car is in motion. However, the known generators used in this art are cumbersome and costly. Specifically, they are extra pieces of equipment within the car that are subject to wear and tear and must be serviced and/or replaced on a periodic basis. Moreover, the known generators do not maximize their potential to create energy. Accordingly, an apparatus and method are desirable for generating electricity to recharge the battery of a car without the added cost and maintenance of cumbersome equipment while maximizing the quantity of energy produced.

SUMMARY OF THE INVENTION

The present invention relates to an apparatus and method for generating electrical energy from mechanical energy.

In one aspect of the invention, an apparatus is provided with an enclosure mounted within an interior of an engine compartment of a vehicle and transverse to a front of the vehicle. The enclosure is in communication with fluid flow that is generated by movement of the vehicle. An electromechanical generator is mounted in the enclosure and is also in electrical communication with a battery. The generator includes an integrated rotational element for generating the electrical energy from a fluid source. The rotational element is mounted within the enclosure and rotates about an axis in response to receipt of fluid flow in the enclosure. A magnet is coupled to a distal end of the rotational element and is subject to rotation together with the rotational element. In addition, an electrically conductive material is provided spaced about a relatively concentric housing that is in communication with the magnet. An electrical charge is generated by the magnet and the conductive material in response to rotation of the rotational element. An electrical connection is provided to communicate the electrical charge generated by the rotational element to the battery.

In another aspect of the invention, an apparatus is provided with an enclosure mounted within an interior compartment of a vehicle. The enclosure is mounted transverse to a front of the vehicle and in communication with a fluid flow generated by movement of the vehicle. The enclosure has a plurality of interior compartments, and each of the compartments is configured to receive and mount a single modular electro-mechanical generator component which is in electrical communication with a battery. Each of the generator components comprises a generator mounted to a brace and a rotational element in communication with the generator through a shaft. The rotational element is adapted to rotate about an axis upon receipt of fluid flow in the enclosure. A first electro-mechanical generator component is provided and housed in a first compartment of the enclosure and adjacent to a second electro-mechanical generator component housed in an adjacent compartment. The first generator includes a first rotational element adapted to rotate in a first rotational direction. The second generator includes a second rotational element adapted to rotate in a second rotational direction. The first and second rotational directions are different. An electrical charge is generated by each of the generator components through rotation of the rotational elements. An electrical connection is provided to communicate the generated electrical charge to the battery.

In yet another aspect of the invention, an apparatus is provided with an electro-mechanical generator mounted in a frame and in electrical communication with a battery. The electro-mechanical generator unit is integrated into a rotational element that includes: a first rotational element mounted within the frame to rotate about an axis upon receipt of fluid flow; a plurality of blades in communication with the first rotational element with a proximal end of each of the blades mounted adjacent to the first rotational element and a distal end of each of the blades in communication with a second rotational element; a magnet housed in the second rotational element; and an electrically conductive material housed in a third element spaced apart from the second rotational element. The magnet and the electrically conductive material generate an electrical charge from rotation of the magnet in close proximity to the electrically conductive material. The electrical charge is communicated to the battery through an electrical connection.

Other features and advantages of this invention will become apparent from the following detailed description of the presently preferred embodiments of the invention taken in conjunction with the accompanying drawings.

DETAILED DESCRIPTION

Overview

The present invention relates to an apparatus and method for generating electricity, and/or charging a battery with the generated electricity based upon a mechanical energy source. Fluid flow is utilized as the mechanical energy source to exert a rotational force on a turbine. Magnets mounted with respect to blades of the turbine generate electrical energy through the presence and proximity of an electrically conductive material. The generated electrical energy is stored in a battery and is used as a power source.

Technical Details

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of fluid flow turbines and integrated alternator units associated therewith to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
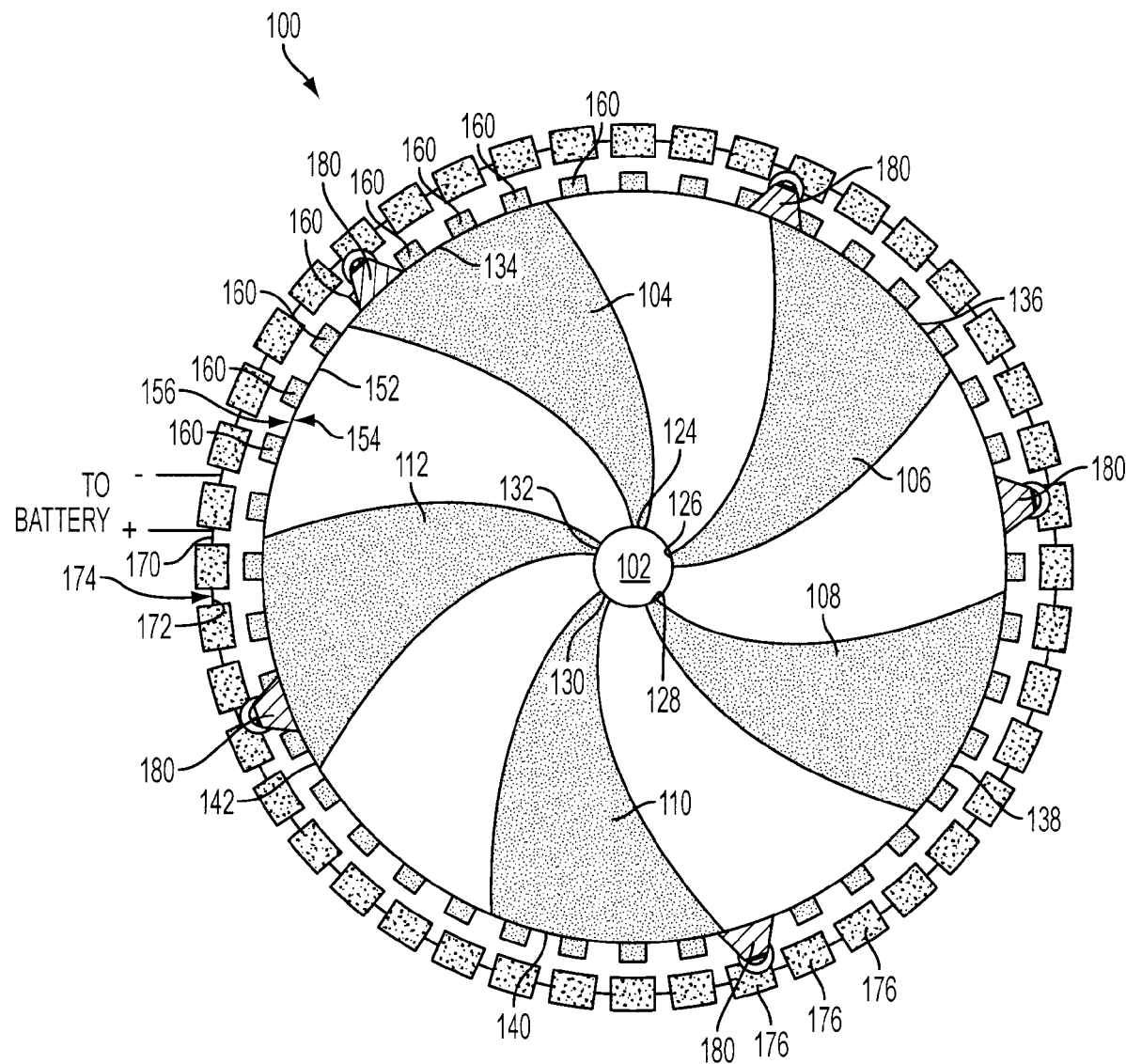
FIG. 1 is a front view of a fluid flow turbine with an integrated generator.

FIG. 1 is a front view of a fluid flow turbine (100) with an integrated generator. As shown, the turbine includes a central rotational element (102) with a plurality of fan blades (104), (106), (108), (110), and (112) in communication with the rotational element (102). More specifically, each fan blade has a proximal end and a distal end. Fan blade (104) has proximal end (124) and distal end (134), fan blade (106) has proximal end (126) and distal end (136), fan blade (108) has proximal end (128) and distal end (138), fan blade (110) has proximal end (130) and distal end (140), and fan blade (112) has proximal end (132) and distal end (142). The proximal end of each fan blade is in communication with the central rotational element (102). More specifically, the proximal end (124) of fan blade (104) is connected to the central rotational element (102), the proximal end (126) of fan blade (106) is connected to the central rotational element (102), the proximal end (128) of fan blade (108) is connected to the central rotational element (102), the proximal end (130) of fan blade (110) is connected to the central rotational element (102), and the proximal end (132) of fan blade (112) is connected to the central rotational element (102). The distal end (134)-(142) of each fan blade (104)-(112), respectively, is mounted to a second rotational element (152). In one embodiment, the central rotational element (102) and the second rotational element (152) are concentric. As the fan blades (104)-(112) rotate, the second rotational element (152) rotates in the same direction and at the same rotational speed as the central rotational element (102).

The second rotational element (152) has an interior surface (154) and an exterior surface (156). The interior surface (154) is in communication with the distal ends (134)-(142) of each of the fan blades (104)-(112). The exterior surface (156) has a plurality of magnets (160) attached thereto. In one embodiment, the magnets are stationary and are fixed in specific location of the exterior surface (156).

A third circumferential element (170) is positioned in relation to the second rotational element (152). The third circumferential element (170) is mounted concentric to the central and second rotational elements (102) and (152), respectively. The third circumferential element (170) has an interior surface (172) and an exterior surface (174). The interior surface (172) is positioned adjacent to the exterior surface (156) of the second rotational element. The interior surface (172) has electrically conductive material (176). In one embodiment, the electrically conductive material is copper wire. Similarly, in one embodiment, the third circumferential element (170) remains stationary. One or more bearings (180) are provided and extend from the second rotational element (152) to the third circumferential element (170). The bearings are spaced about the circumference of the second rotational element (152). Although five bearings (180) are shown herein, in one embodiment there may be a greater quantity of bearings or fewer bearings depending upon the size and configuration of the turbine (100). In one embodiment, the bearing (180) is a device to permit constrained relative motion between the second rotational element (152) and the third circumferential element (170). The bearings (180) may be comprised of nylon, metal, or any material that supports the rotation of the second rotational element (152). Similarly, in one embodiment covers may be provided for the bearings to keep dirt or any unwanted foreign matter off the bearing (180). The second rotational element (152) rotates in a clockwise or counter-clockwise direction on the bearing (180). Similarly, the central rotational element (102) rotates in conjunction with rotation of the second rotational element (152). As the second rotational element (152) rotates on the bearings (180) about the axis of the central rotational element (102) an electrical charge (not shown) is generated by the movement of the magnets (160) with respect to the placement of the electrically conductive material (176). The electrical charge is stored in a battery (not shown) in communication with the turbine (100) in the form of electrical energy.

Figure 7:
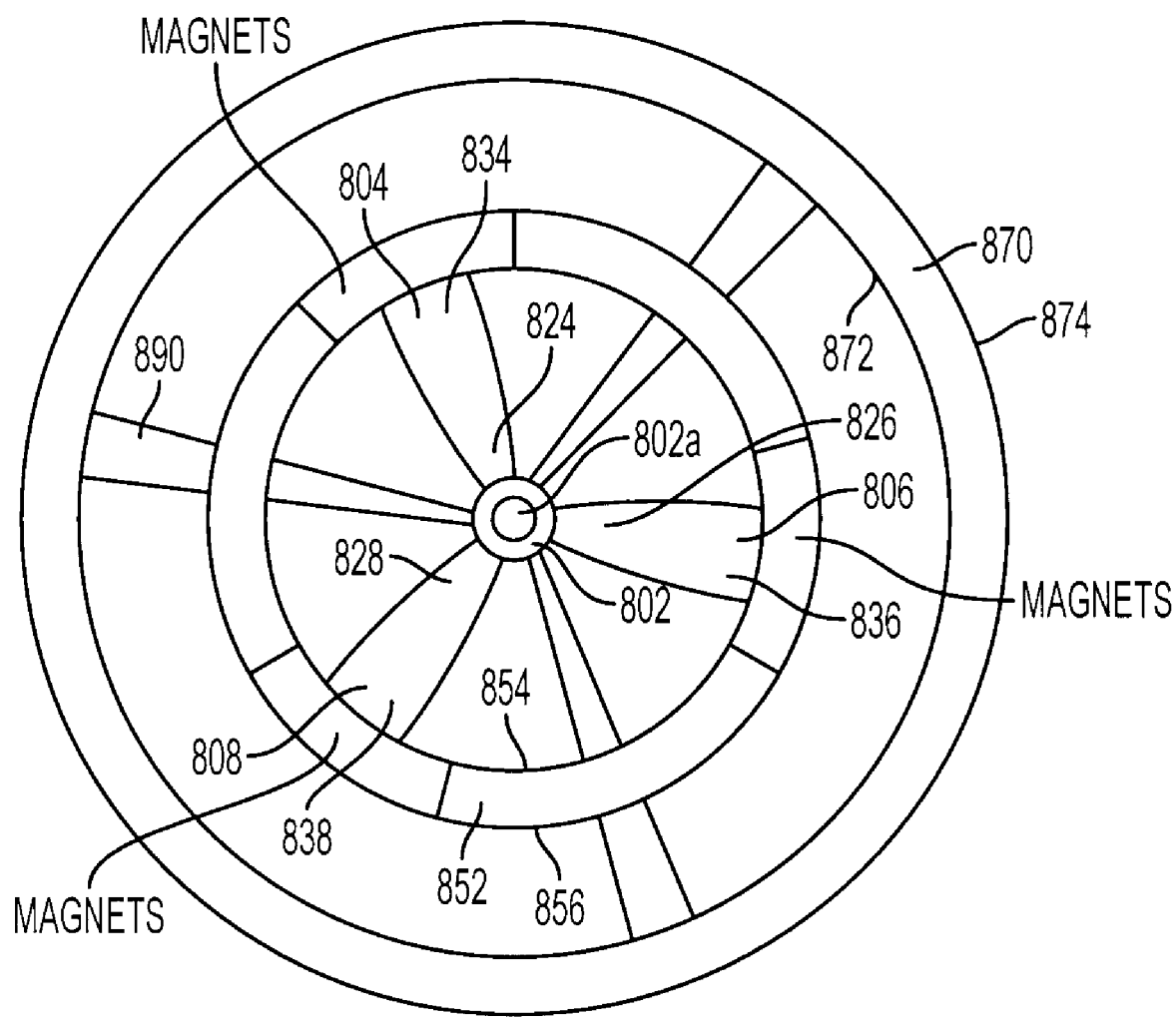
FIG. 7 is a front view of a fluid flow turbine with an integrated generator unit.

Another form of an integrated fluid flow turbine (800) is shown in FIG. 7. As shown, the turbine includes a central rotational element (802) with a plurality of fan blades (804), (806), and (808), in communication with the rotational element (802). Although only three fan blades are shown, the invention should not be limited to this quantity of fan blades in a fluid flow turbine. In one embodiment, the fluid flow turbine may be configured with a larger quantity of blades or a smaller quantity of blades than that shown herein. Each fan blade has a proximal end and a distal end. Fan blade (804) has a proximal end (824) and a distal end (834), fan blade (806) has a proximal end (826) and a distal end (836), and fan blade (808) has a proximal end (828) and a distal end (838). The proximal end of each fan blade is in communication with the central rotational element (802). More specifically, the proximal end (824) of fan blade (804) is connected to the central rotational element (802), the proximal end (826) of fan blade (806) is connected to the central rotational element (802), and the proximal end (828) of fan blade (808) is connected to the central rotational element (802). The distal end (834), (836), and (838) of each fan blade (804), (806), and (808), respectively, is secured to or otherwise in communication with a second rotational element (852). In one embodiment, the central rotational element (802) and the second rotational element (852) are concentric. As the fan blades (804), (806), and (808) rotate, the second rotational element (852) rotates in the same direction and at the same rotational speed as the central rotational element (802).

The second rotational element (852) has an interior wall (854) and an exterior wall (856). The interior wall (854) is in communication with the distal ends (834), (836), and (838) of each of the respective fan blades (804), (806), and (808). A plurality of magnets (not shown) is mounted within the second rotational element (852) between the interior wall (854) and the exterior wall (856). In one embodiment, the magnets are stationary. Similarly, in one embodiment, the magnets are evenly spaced around the circumferences of the second rotational element (852). When subject to a fluid force, the fan blades (804), (806), and (808) rotate about the axis of the central rotational element (802), in either a clockwise or counter-clockwise direction. The second rotational element (852) rotates in conjunction with and in the same direction as the fan blades (804), (806), and (808). Accordingly, rotation of the fan blades causes movement of one or more stationary magnets about the same axis of rotation.

A third circumferential element (870) is positioned in relation to the second rotational element (852). The third circumferential element (870) is mounted concentric to the central and second rotational elements (802) and (852), respectively. In one embodiment, a frame (890) is provided to secure the central rotational element (802) to the third circumferential element (870). The third circumferential element (870) has an interior wall (872) and an exterior wall (874). In one embodiment, the third circumferential element (870) is stationary and fixed in position relative to the first and second rotational elements (802) and (852), respectively, by the frame (890). The interior wall (872) of the third circumferential element (870) is positioned adjacent to the exterior wall (856) of the second rotational element (852). Electrically conductive material (not shown) is mounted within the third circumferential element (870) between the interior wall (872) and the exterior wall (874). In one embodiment, the electrically conductive material (876) is in the form of a plurality of individual units spaced about the circumference of the third circumferential element (870). Similarly, in one embodiment, each separate unit of electrically conductive material is in communication with a capacitor and a separate rectifier bridge. This configuration enables each separate unit to function as an individual generator unit. In one embodiment, a capacitor is employed with the coil units to allow for storage of electrical energy in between the passing of magnets from the second rotational element (852). As the magnets of the second rotational element (852) pass in close proximity to the electrically conductive material (876) of the third circumferential element (870) electricity is generated.

To facilitate rotation of the first rotational element (802) about a central axis (802a), one or more bearings (not shown) are provided. The bearing is a device that permits constrained relative motion of the blades (804), (806), and (808) about the axis (802a). The bearings may be comprised of nylon, metal, or any other material that supports the rotation of the first rotational element (802) about the axis (802a). Similarly, in one embodiment covers may be provided for the bearings to keep dirt or unwanted material off of the bearings.

Figure 2:
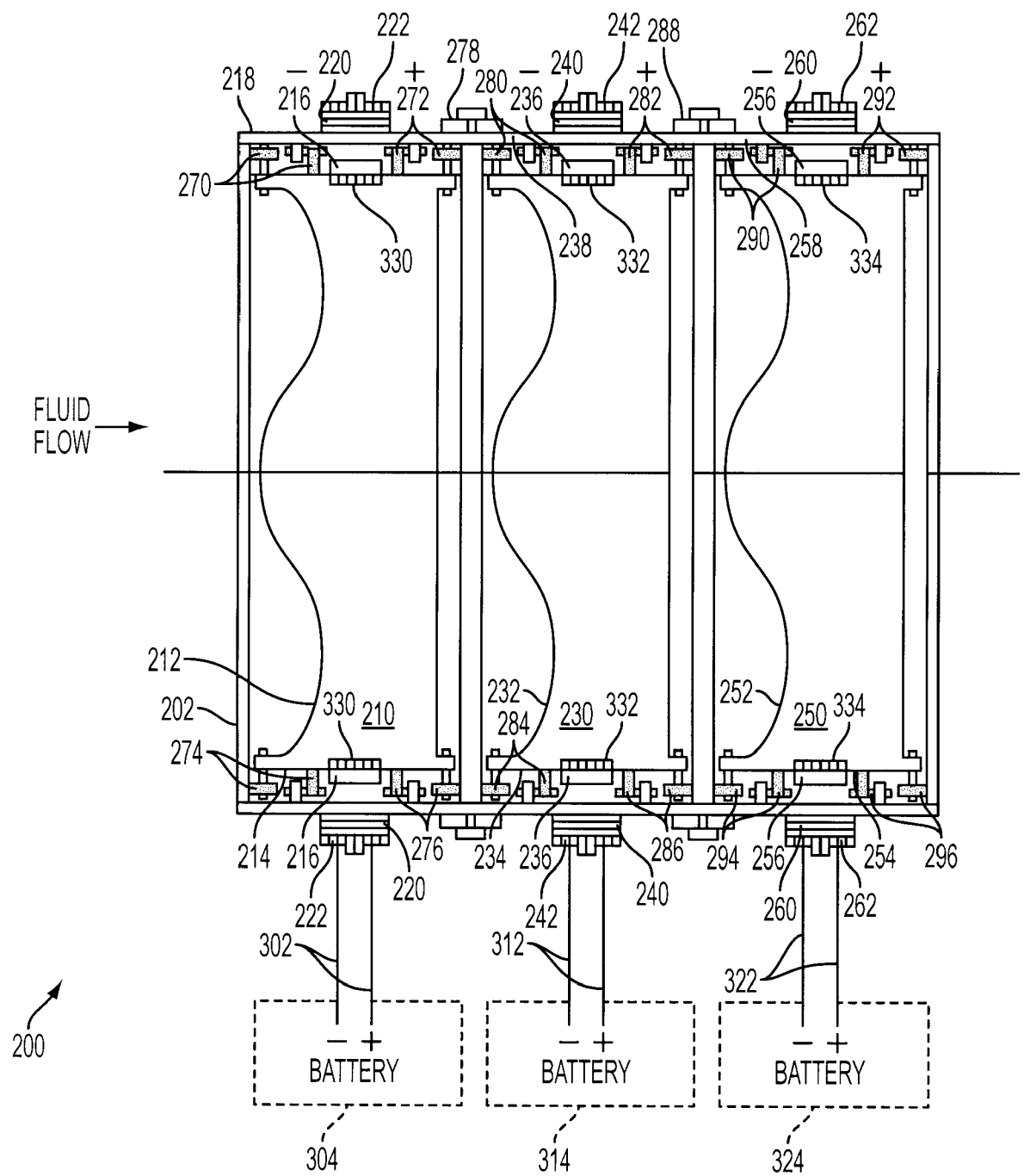
FIG. 2 is a side view of a plurality of aligned integrated generator units.

FIG. 2 is a side view (200) of a plurality of fluid flow turbines, each with an integrated generator unit as shown in FIG. 1. In one embodiment, a similar configuration may be provided for the fluid flow turbines arrangement shown in FIG. 7. More specifically, as shown herein, a housing (202) is provided with three integrated generator units mounted therein (210), (230), and (250). The housing is a hollow enclosure sized to receive the integrated generator units. The fan blades (212), (232), and (252) are shown as having an undulated profile. In one embodiment, the fan blades may have a different profile and the profile should not be limited to that shown herein. The second rotational element (214), (234), and (254) of each unit (210), (230), and (250), respectively, is shown with magnets (216), (236), and (256) mounted to an exterior surface thereof. In one embodiment, a plate is provided to support the positioning of the magnets with respect to the rotational elements. As shown, plate (330) is provided to support and position magnets (216), plate (332) is provided to support and position magnets (236), and plate (334) is provided to support and position magnets (256). The third circumferential element (218), (238), and (258) is shown spaced apart from the exterior surface of the second rotational element (214), (234), and (254). Electrically conductive material (220), (240), and (260) is shown in communication with the third circumferential elements (218), (238), and (258) and in close proximity to the magnets (216), (236), and (256), respectively. In one embodiment, a plate is provided to support the positioning of the electrically conductive material with respect to the rotational elements. As shown, plate (222) is provided to support and position electrically conductive material (220), plate (242) is provided to support and position electrically conductive material (240), and plate (262) is provided to support and position electrically conductive material (260). In addition, as shown in FIG. 1 bearings are provided to support rotation of the second rotational element with respect to the third circumferential element. As shown herein in FIG. 2, there are at least four bearings for each unit. More specifically, unit (210) has bearings (270), (272), (274) and (276), unit (230) has bearings (280), (282), (284), and (286), and unit (250) has bearings (290), (292), (294), and (296). The structure of the bearings is shown with horizontal and vertical portions. The invention should not be limited to the mechanical structure of the bearings shown herein. In one embodiment, the structure of the bearings may be different or replaced with an alternative mechanical, electrical, or chemical element while continuing to provide a structure to support rotation of the second rotational element. Similarly, in one embodiment, one or more sets of the bearings may be provided on other parts of the generator unit. Similarly, the generator units may include a different quantity of bearings than that shown in the illustrative example.

In addition to securing the generator units to the housing, in one embodiment it may be desirable to secure adjacent generator units. As shown in FIG. 2, a secondary mechanical fastening element (278) is shown securing the first generator unit (210) to the second generator unit (230). Similarly, a secondary mechanical fastening element (288) is shown securing the second generator unit (230) to the third generator unit (250). In one embodiment, adjacent generator units may require more than one secondary fastening element to secure the adjacent unit. For example, as shown in the profile view of FIG. 2, a secondary fastening element is replicated on a diametrically opposite side of the housing.

As the fans of the generator units are exposed to fluid flow, the fans turn in a clockwise or counter clockwise direction depending upon the placement of the specific unit in the array of units. In one embodiment, fans of adjacently mounted units rotate in opposite directions to increase fluid flow through the housing. For example, the fan of a first generator unit may rotate clockwise, and a fan of an adjacent generator unit may rotate in a counter-clockwise direction. Rotation of the fan blades and associated magnets about the electrically conductive material generates electrical energy. In one embodiment, the blades of adjacently mounted fans are oppositely set so that the blades rotate in contra-directions when subject to impingement by a fluid flow. One or more batteries are connected to the generator units to store the electrical energy generated by the units. Accordingly, the generator serves to generate electricity, and in one embodiment to charge a battery with the generated electricity.

As shown in FIG. 2, the first generator unit (210) has an electrical connection (302) to a battery (304), the second generator unit (230) has an electrical connection (312) to a battery (314), and the third generator unit (250) has an electrical connection (322) to a battery (324). In one embodiment, the individual batteries (304), (314), and (324) may be in the form of a bank of a plurality of batteries. The quantity of batteries in each bank may vary depending upon the energy generated by the respective generator units and the storage capacity of the individual batteries in the battery banks. In one embodiment, the electrical energy generated by each generator unit may be communicated to an energy source without use of a battery. Accordingly, the electrical energy generated by the generator units are communicated to a mechanism that provides a load control between the generator and a motor that requires the electrical energy as an input source.

Figure 3:
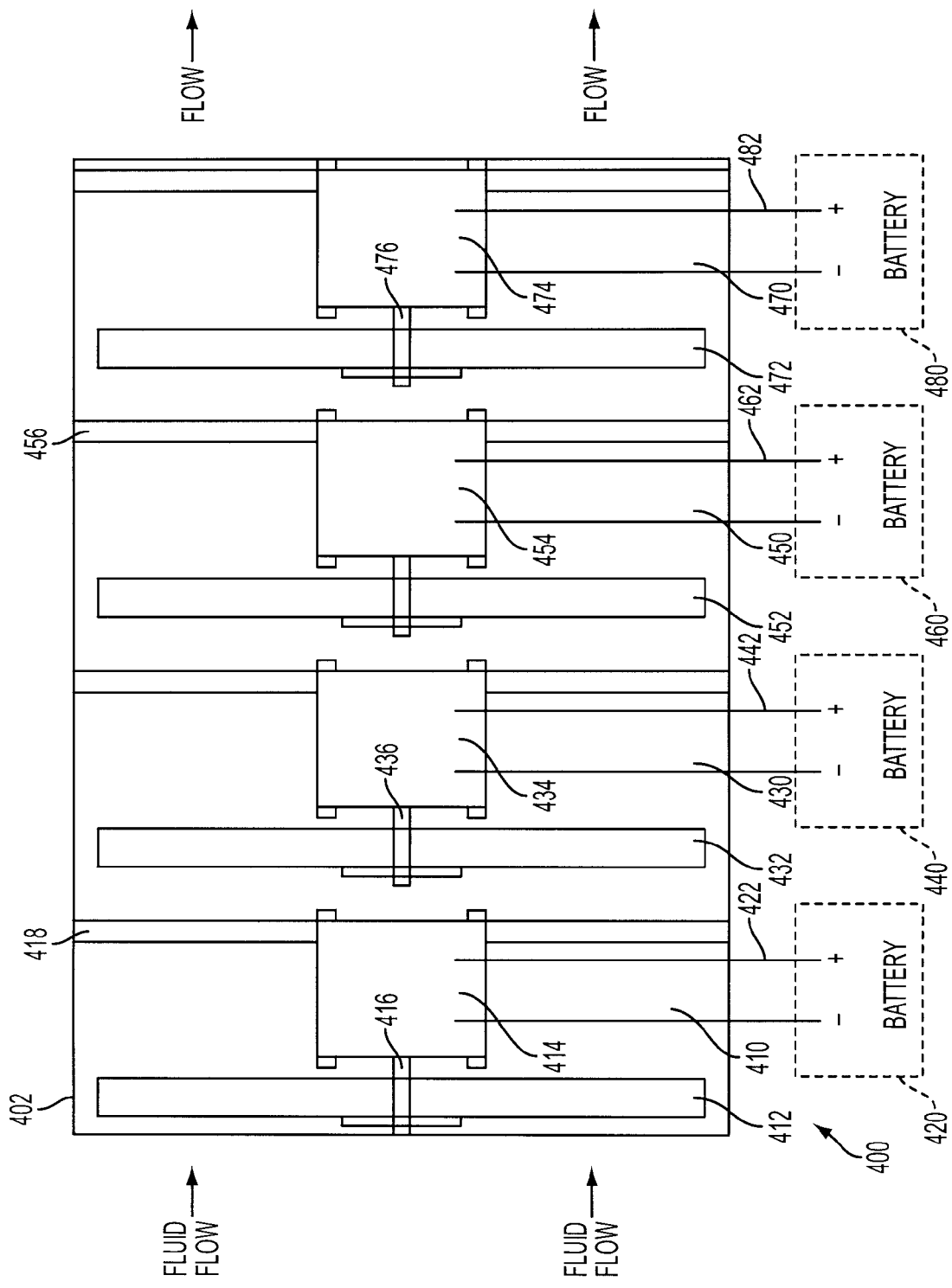
FIG. 3 is a side view of another embodiment of an integrated generator unit.

FIG. 3 is a side view of a plurality of alternately configured fluid flow turbines (400). More specifically, as shown herein, a housing (402) is provided with four generator units mounted therein (410), (430), (450), and (470). Each generator unit includes a brace, a rotational unit, and a generator. For example, the first generator unit (410) includes a rotational unit (412) connected to a generator (414) through a shaft (416). The generator (414) is mounted to a brace (418). Similarly, the second generator unit (430) includes a rotational unit (432) connected to a generator (434) through a shaft (436), the third generator unit (450) includes a rotational unit (452) connected to a generator (454) through a shaft (456), and the fourth generator unit (470) includes a rotational unit (472) connected to a generator (474) through a shaft (476). The housing (402) is a hollow enclosure sized to receive the generator units. In one embodiment, each of the rotational units may include a plurality of fan blades (not shown); wherein the individual fan blades may have an undulated profile. In one embodiment, the fan blades may have a different profile and the profile should not be limited to that shown herein. Each of the generator components (414), (434), (454), and (474) house a set of magnets and electrically conductive material. As the rotational units of the individual generator units rotate about the associated shaft, rotation of magnets in close proximity to electrically conductive material occurs within the confines of the respective generator and electrical energy is generated.

Each generator unit, i.e. each generator with its rotational unit, is a modular component within the housing (402). A failure of one generator unit allows for replacement of the unit without affecting the integrity of the system as each unit is independently secured to the housing (402). As noted with respect to FIG. 2, the modular aspect of the integrated generator units enables maintenance, repair, and replacement of the units within the housing to be conducted on an individual basis. For example, when maintenance, repair, and/or replacement of one of the units are determined to be necessary, the fastening elements that secure the units to the housing may be released. If there are any secondary fastening elements that secure the unit to an adjacent unit, they may be disconnected to enable the designated unit to be removed from the housing without affecting the operation of the remaining units. Accordingly, each integrated unit is secured to the housing and/or an adjacent unit and operates independently to generate electricity and to communicate the generated electricity to a battery.

The rotational elements of adjacently mounted generator units (410), (430), (450), and (470) rotate when exposed to fluid flow. In one embodiment, adjacent sets of fan blades are oppositely mounted so that adjacent rotational elements rotate in opposite directions when subject to impingement by a fluid flow. For example, a first generator unit (410) may rotate in a clockwise direction, causing the second generator unit (430) to rotate in a counter-clockwise direction and the third generator unit (450) to rotate in a clockwise direction. The opposite rotational direction enables more fluid energy to be available within the enclosure, which in turn generates more electrical energy.

Each of the generator units (410), (430), (450), and (470) has an electrical connection to a battery. More specifically, the first generator unit (410) has an electrical connection (422) to battery (420), the second generator unit (430) has an electrical connection (442) to battery (440), the third generator unit (450) has an electrical connection (462) to battery (460), and the fourth generator unit (470) has an electrical connection (482) to battery (480). In one embodiment, the individual batteries (420), (440), (460), and (480) may be in the form of a bank of a plurality of batteries. The quantities of batteries in each bank may vary depending upon the energy generated by the respective generator units and the storage capacity of the individual batteries in the battery banks. Similarly, in one embodiment, the electrical energy generated by each generator unit may be communicated to an energy source or energy storage apparatus without use of a battery. Accordingly, the electrical energy generated by the generator units are communicated to a mechanism that provides a load control between the generator and a motor that requires the electrical energy as an input source.

As shown above in FIG. 2 with respect to the integrated generator unit, each of the generator units are connected to one or more batteries to store electrical energy generated by the generator units. The quantity of batteries in communication with each generator unit may vary depending upon the energy generated by the respective generator units and the storage capacity of the individual batteries in the battery banks.

Figure 4:
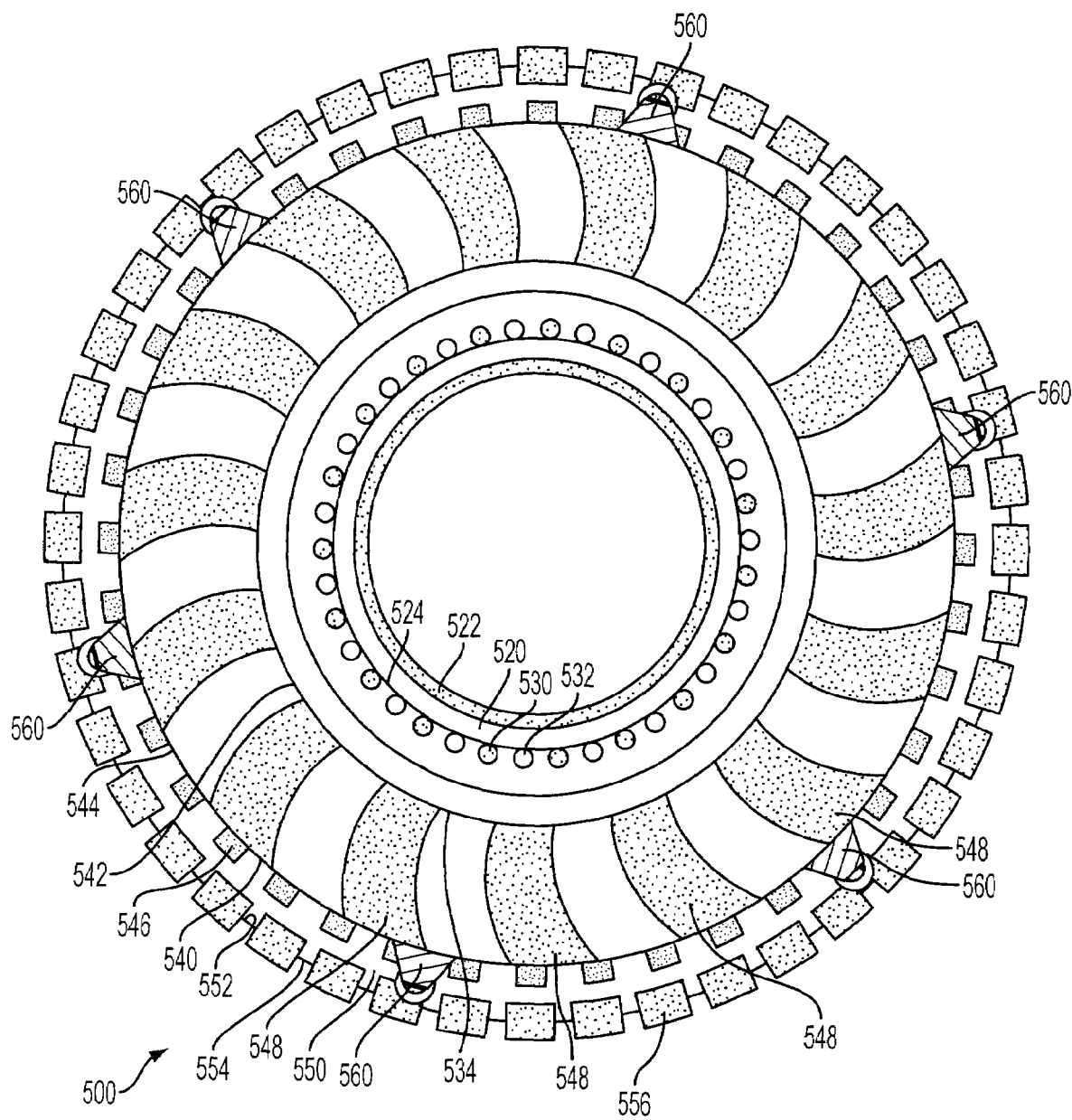
FIG. 4 is front view of one embodiment of an integrated generator unit.

In one embodiment, the position of the magnets with respect to the electrically conductive material may be modified. FIG. 4 is a front view (500) of another embodiment of an integrated generator unit. The generator unit (510) has a plurality of circumferential units (520), (530), (540), and (550). A first circumferential element (520) is positioned concentric and adjacent to a second circumferential element (530). The first circumferential unit (520) of the generator unit is stationary and functions to hold the second circumferential unit (530) in place. The first circumferential unit (520) has an interior surface (522) and exterior surface (524). The interior surface (522) is adjacent to a hollow opening size to receive a motor (not shown). Similar to the first circumferential unit (520), the second circumferential unit (530) has an interior surface (532) and an exterior surface (534). In one embodiment, the second circumferential unit (530) is roller bearing that supports rotation of a third circumferential unit (540). The interior surface (532) of the second circumferential unit (530) is adjacent to and spaced apart from the exterior surface (524) of the first circumferential unit (520). The third circumferential unit (540) has an interior surface (542) and an exterior surface (544). The interior surface (542) is spaced apart from an adjacent to the exterior surface (534) of the second circumferential unit (530). The exterior surface (544) of the third circumferential unit (540) has a plurality of magnets (546) counted thereon. In addition, the area between the interior and exterior surfaces (542) and (544), respectively, has a plurality of fan blades (548). The fourth circumferential unit (550) has an interior surface (552) and an exterior surface (554). The interior surface (552) has electrically conductive material (556) attached thereto. In one embodiment, the fourth circumferential unit is stationary. One or more bearings (560) are provided between the third and fourth circumferential units (540) and (550), respectively. The bearings (560) are provided and extend from the third circumferential unit (540) to the fourth circumferential unit (550). The bearings are spaced about the circumference of the third circumferential unit (540). Although five bearings (560) are shown herein, in one embodiment there may be a greater quantity of bearings or fewer bearings depending upon the size and configuration of the turbine (500). In one embodiment, the bearing (560) is a device to permit constrained relative motion between the third circumferential unit (540) and the fourth circumferential element (550). The bearings (560) may be comprised of nylon, metal, or any material that supports the rotation of the third circumferential unit (540). Similarly, in one embodiment covers may be provided for the bearings to keep dirt or any unwanted foreign matter off the bearing (560).

As the fan blades (548) are exposed to a fluid flow, the third circumferential unit (540) rotates on the bearings (560) about an axis of rotation and an electrical charge (not shown) is generated by the movement of the magnets (546) with respect to the placement of the electrically conductive material (556). The electrical charge is stored in a battery (not shown) in communication with the turbine (500) in the form of electrical energy. In one embodiment, the first circumferential unit (520) and the fourth circumferential unit (550) may be stationary, and the third circumferential unit (540) may rotate about the bearings (560) between the third and fourth circumferential units, (540) and (550), respectively, and the bearings of the second circumferential unit (530). Similarly, in one embodiment, the exterior surface of the third circumferential unit (540) may include electrically conductive material, and the interior surface of the fourth circumferential unit (550) may include magnets mounted thereon. In either embodiment, electrical energy is generated either by rotation of the magnets with respect to the electrically conductive material or by rotation of the electrically conductive material with respect to the magnets. In one embodiment, the magnet mounted on one of the circumferential units in close proximity to the rotational blades may have a stronger magnetic pull than the magnet mount further from the rotational blades. Accordingly, the alternate integrated generator unit may utilize different size magnets to generate at least as much electrical energy, if not more, than the integrated generator unit with the magnets mounted adjacent to a distal end of the rotational blades.

In one embodiment, the shaft is a single shaft shared by each of the units. However, in one embodiment, the shaft may be a separate shaft for each unit that attaches to the adjacent shaft to form a single continuous shaft. An attachment element (not shown) secures the first rotational elements adjacent to the proximal end of the rotational blades. As noted above, electrical energy is generated by rotation of the magnets of one of the circumferential units with respect to electrically conductive material of the other circumferential unit. An electrical connection (not shown) is provided from each integrated generator unit to a battery, or bank of batteries, for storage of generated electrical energy.

Figure 8:
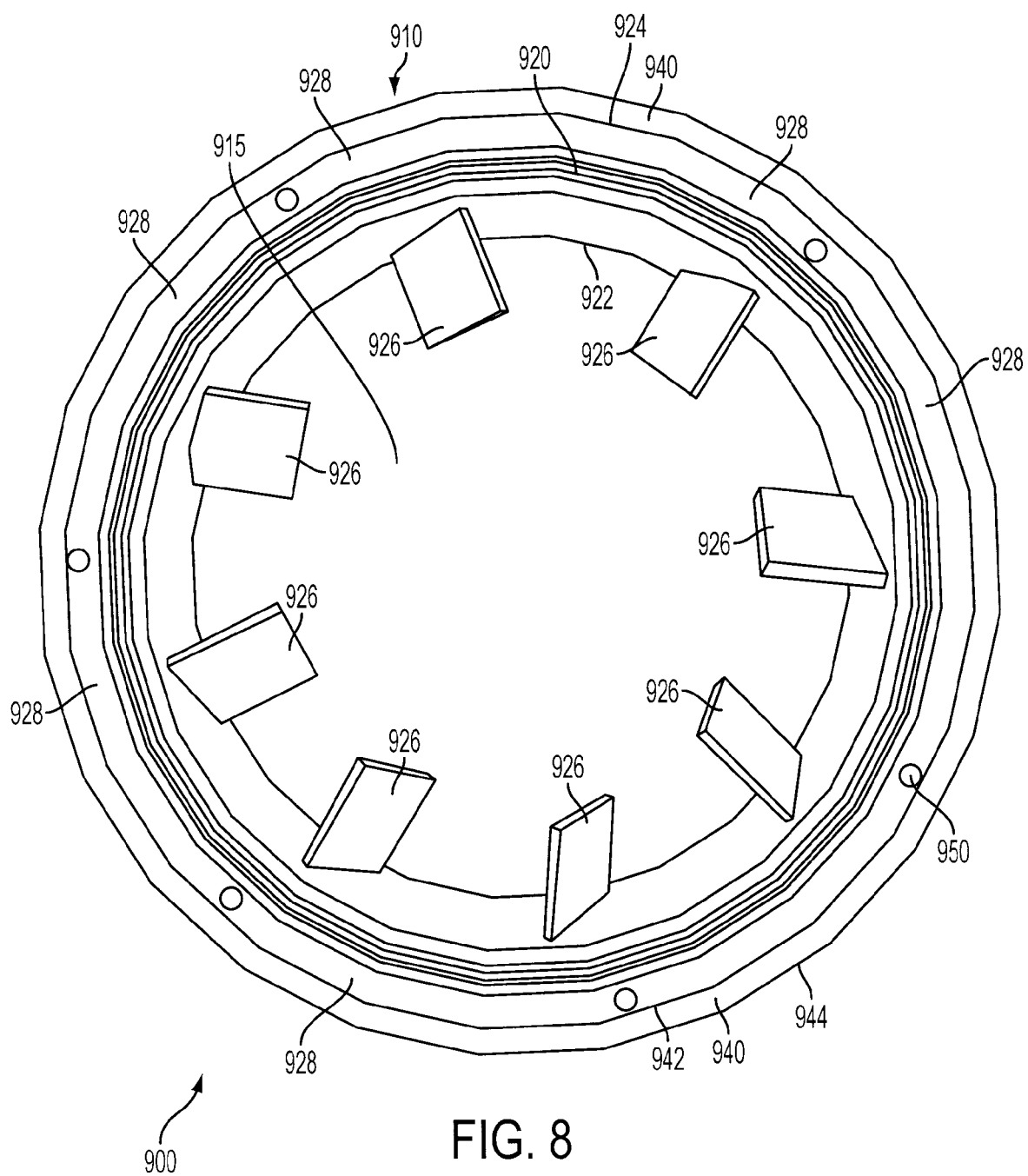
FIG. 8 is a front view of a fluid flow turbine with an integrated generator unit along similar engineering principles to the embodiment shown in FIG. 4.

FIG. 8 is a front view (900) of another embodiment of an integrated generator unit along similar engineering principles to the embodiment shown in FIG. 4. The generator unit (910) has two circumferential units (920) and (940). A first circumferential element (920) is positioned concentric and adjacent to a second circumferential element (940). The second circumferential unit (940) of the generator unit is stationary and functions to hold the first circumferential unit (920) in a rotating environment relative to the position of the second circumferential unit (940). The first circumferential unit (920) has an interior surface (922) and exterior surface (924) with blades (926) positioned to extend from the interior surface to an adjacent to a hollow opening (915). The exterior surface (924) is in communication with magnetic material (928). In one embodiment, the magnetic material (928) is flush with the exterior surface (924) or embedded between the interior surface (922) and the exterior surface (924), and is thereby not visible from a front view.

Similar to the first circumferential unit (920), the second circumferential unit (940) has an interior surface (942) and an exterior surface (944). In one embodiment, the second circumferential unit (940) has roller bearing (950) that supports rotation of the first circumferential unit (920). Although a plurality of roller bearings (950) is shown herein, the invention should not be limited to the quantity of roller bearings shown herein. The interior surface (942) of the second circumferential unit (940) is adjacent to and spaced apart from the exterior surface (924) of the first circumferential unit (920). Electrically conductive material (not shown) is mounted within the second circumferential element (940) between the interior surface (942) and the exterior surface (944). In one embodiment, the electrically conductive material (not shown) is in the form of a plurality of individual units spaced about the circumference of the second circumferential element (940). Similarly, in one embodiment, each separate unit of electrically conductive material is in communication with a capacitor and a separate rectifier bridge. This configuration enables each separate unit to function as an individual generator unit. In one embodiment, a capacitor is employed with the coil units to allow for storage of electrical energy in between the passing of magnets from the first circumferential element (920). As the magnets of the first circumferential element (920) pass in close proximity to the electrically conductive material of the second circumferential element (940) electricity is generated.

As the blades (926) are exposed to a fluid flow, the first circumferential unit (920) rotates on the bearings (950) about an axis of rotation and an electrical charge (not shown) is generated by the movement of the magnets (928) with respect to the placement of the electrically conductive material of the second circumferential unit (940). In one embodiment, fluid flow through the hollow interior (915) causes rotation of the blades (926). The electrical charge is stored in a battery (not shown) in communication with the generator unit (900) in the form of electrical energy. In one embodiment, the first circumferential unit (920) may be stationary, and the second circumferential unit (940) may rotate about the bearing (950) between the first and second circumferential units, (920) and (940), respectively, and the bearing (950). Similarly, in one embodiment, the placement of the magnetic material and the electrically conductive material may be reversed, with the first circumferential unit (920) having electrically conductive material, and the second circumferential unit (940) having magnetic material. In either embodiment, electrical energy is generated either by rotation of the magnets with respect to the electrically conductive material or by rotation of the electrically conductive material with respect to the magnets. In one embodiment, the magnet mounted on one of the circumferential units in close proximity to the rotational blades may have a stronger magnetic pull than the magnet mount further from the rotational blades. Accordingly, the alternate integrated generator unit may utilize different size magnets to generate at least as much electrical energy, if not more, than the integrated generator unit with the magnets mounted adjacent to a distal end of the rotational blades.

Figure 5:
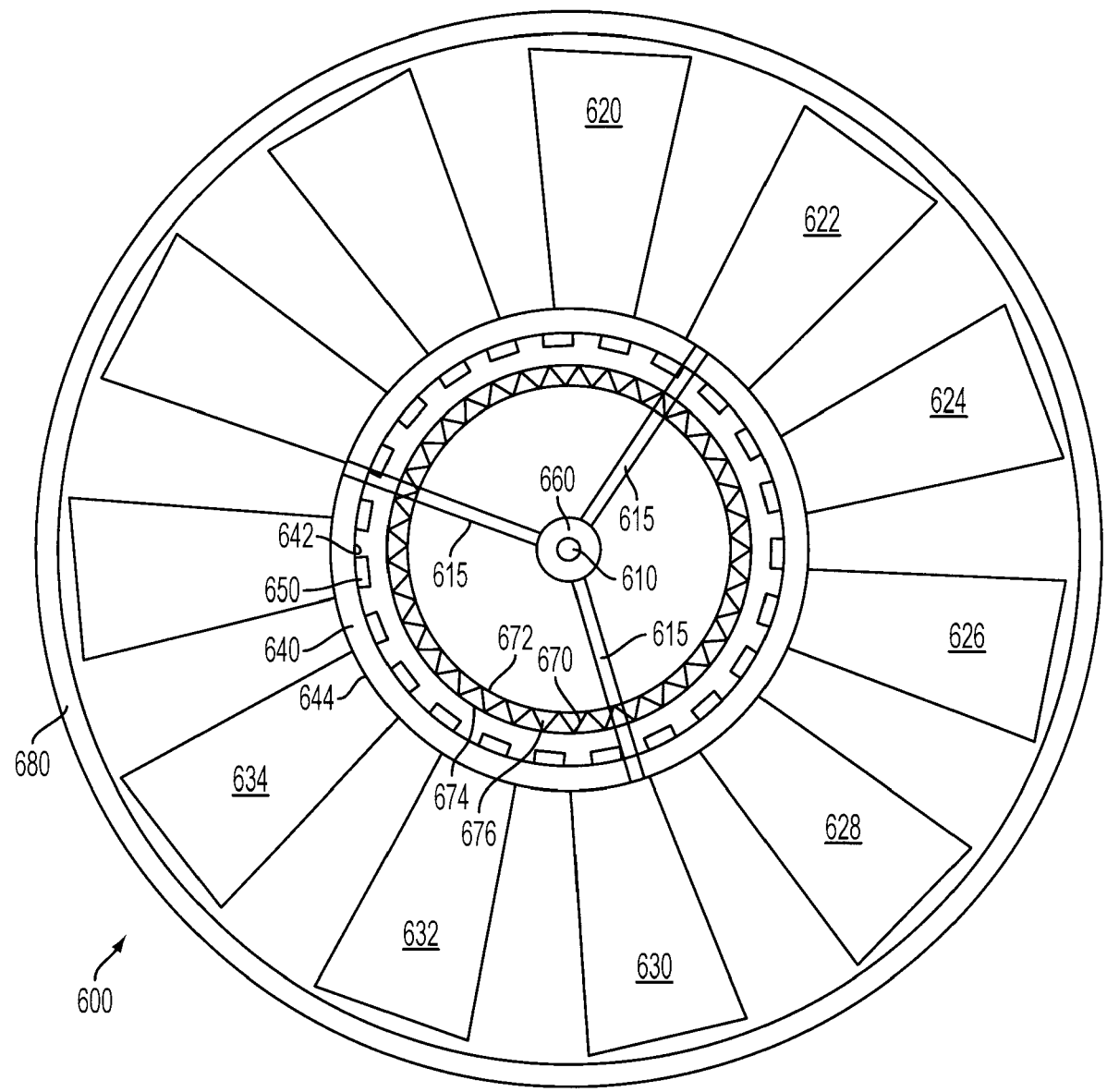
FIG. 5 is a front view of another embodiment of an integrated generator unit.

FIG. 5 is a front view (600) of an integrated generator unit with a modified placement of magnets with respect to electronically conductive material. As shown, the integrated unit has a shaft (610) and a plurality of rotational blades (620), (622), (624), (626), (628), (630), (632), and (634), with each blade having a proximal end and a distal end. The proximal end of each blade is attached to a second circumferential unit (640), which has an interior surface (642) and an exterior surface (644). The exterior surface is attached to the blades, and the interior surface has a plurality of magnets (650) mounted thereto. The shaft (610) has a plurality of rotating arms (615) that extend to the second circumferential unit (640) that supports rotation of the second circumferential unit (640). In addition, a central bearing (660) is provided concentric with the shaft (610), and a first circumferential unit (670) located between the central bearing (660) and the second circumferential unit (640). In one embodiment, the shaft (610), the central bearing (660), the first circumferential unit (670), and the second concentric unit (640) are concentric. The first circumferential unit (670) has an interior surface (672) and an exterior surface (674) with electrically conductive material (676) in communication with either surface. The interior surface (672) faces the central bearing (660) and the exterior surface (674) faces the interior surface (642) of the second circumferential unit (640). As the second circumferential unit (640) is exposed to a fluid flow, it rotates about the axis of the shaft (610). This rotation causes rotation of the magnets (650) about the electrically conductive material of the first circumferential unit (670) generates electrical energy. In one embodiment, the first concentric unit (670) may be stationary. Similarly, in one embodiment, an outside tube is provided to housing the circumferential units (640), (670), and shaft (610), and one or more braces (not shown) are provided to support the first circumferential unit (670) and shaft (610) in a stationary position.

In one embodiment, the integrated generator unit (600) may be mounted within a housing (not shown). Similarly, in one embodiment, the integrated unit may be mounted adjacent to a plurality of units to generate additional electrical energy. The electrical energy generated by each unit is stored in one or more batteries (not shown) in communication with the unit.

In each of the embodiments shown herein, the generator unit is integrated in some form with rotational elements. The placement of the magnets and electrically conductive material with respect to the rotational blades of the unit generate electrical energy. The strength of the individual magnets, the speed at which the magnets move about the electrically conductive material or the rate at which electrically conductive material rotates about the magnets, and the placement of the magnets with respect to the electrically conductive material, all factor into the quantity of electrical energy generated from the individual integrated generator units.

Figure 6:
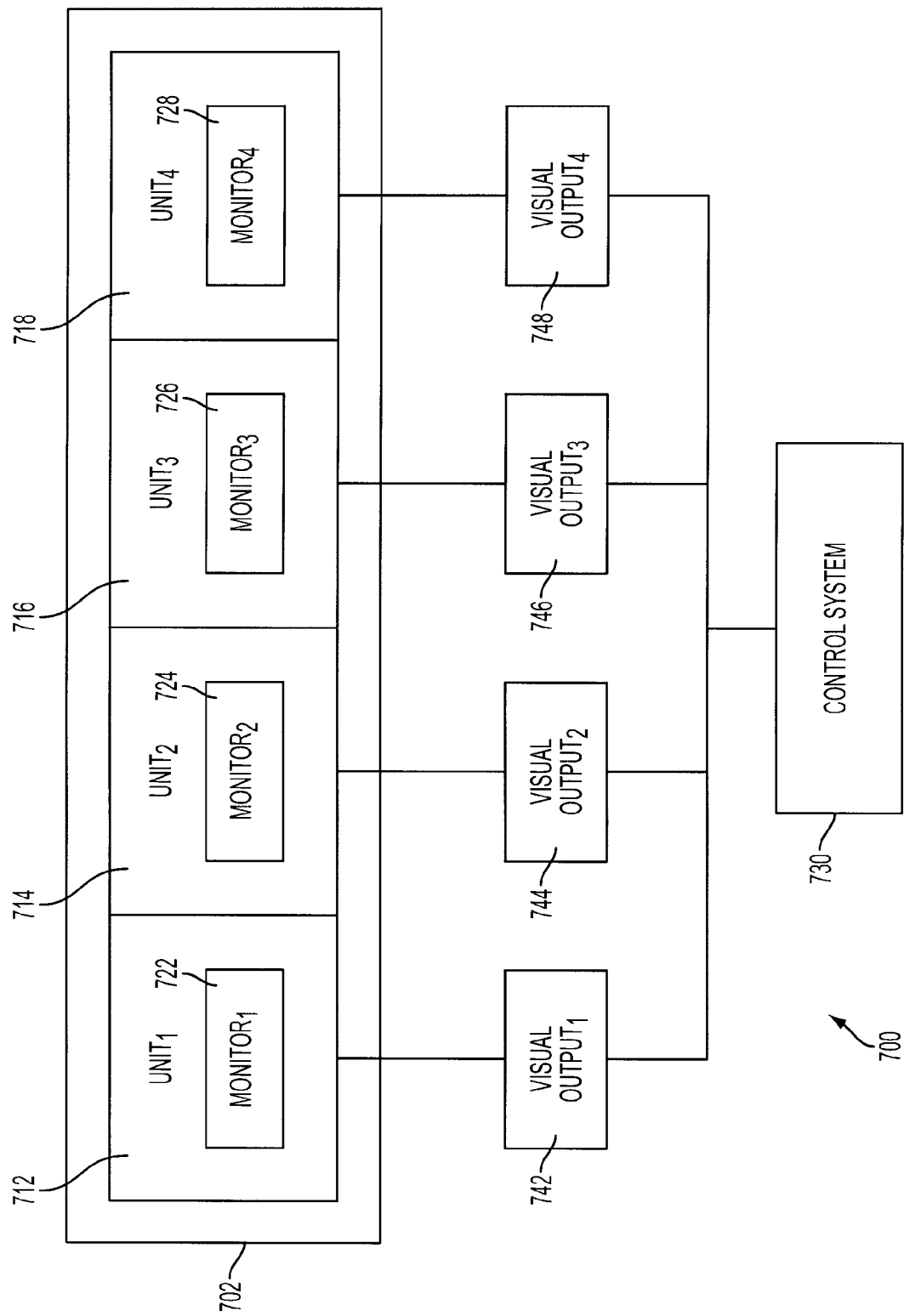
FIG. 6 is a block diagram of a control system to manage operation of the integrated generator units.

Each of the integrated generator units may be stored in a housing that is configured to store a plurality of aligned units. In one embodiment, each of the units is a modular component secured within the housing, i.e. each generator unit is an independent module that can be altered or replaced without affecting the remainder of the system. A system may be provided to monitor each individual unit as well as the combined operation of the units in the housing. FIG. 6 (700) is a block diagram of a control system used in association with the alignment of integrated generator units to monitor and manage operation thereof. As shown, a housing (702) is provided to store one or more integrated generator units. In the example shown herein, the housing (702) has four units mounted therein (712), (714), (716), and (718). In one embodiment, the housing may be configured to house a different quantity of units depending upon energy generation goals and requirements. Each generator unit has a monitor to track the electrical energy generated by the unit and stored in one or more associate batteries. More specifically, unit (712) has monitor (722), unit (714) has monitor (724), unit (716) has monitor (726), and unit (718) has monitor (728). Each of the monitors is connected to a control system (730) that manages the operation of the associated units. More specifically, the control system tracks and monitors the aggregate electrical output for all of the units, as well as the individual electrical output per unit. If any one of the units is determined to be generating less than an optimal amount of electrical energy, i.e. not meeting a threshold for electrical energy output, this information is conveyed by the control system to a third party or third party device. In one embodiment, the control system is in communication with an output device. When it is determined that one or more units is not attaining a threshold level of electrical output, the output device provides a visual, auditory, or tactile signal. For example, in one embodiment, a visual output (742), (744), (746), and (748) may be associated with each unit (712), (714), (716), and (718), respectively. In one embodiment, the visual output is an LED that is either directly attached to the unit, or is located at a remote location to identify a specific unit. When one of the units does not reach a threshold level of output, the control system may illuminate the appropriate LED to convey a problem with the unit. Similarly, in one embodiment, each unit may have more than one LED associated therewith, with each LED having different illuminating colors, or each having the same color. A different color LED may be illuminated to convey different control data, or a pattern of LEDs may be illuminated or non-illuminated to convey different control data. Accordingly, the control system monitors operation of the associated units and conveys operational data of the unit(s).

In one embodiment, the generator units may be in a modular form, such that each unit is independent and may form a part of a larger unit that is comprised of two or more generator units. In the event that the control system, or an alternate monitoring tool, determines that one or more units require replacement, the identified modular unit may be disconnected from the housing and replaced with another generator unit. Removal or replacement of units does not affect the integrity of the housing structure. Furthermore, one or more blades in each of the generator units may have a coating or receive a coating on a surface thereof that mitigates or prevents debris from attaching to a surface of the blade. Debris may include any and all foreign matter that is not a part of the surface of the blade. In one embodiment, the coating may prevent the blade from freezing or otherwise developing a layer of frost on the surface. Debris, frost, and any foreign matter that attaches to the surface of the blade may affect the integrity of the blade and the ability of the blade to rotate.

It will be understood that each of the elements above, may also be useful in alternative applications or constructions differing from the type described above and without departing from the spirit and scope of the invention. In particular, in one embodiment, the generator unit generates direct current electricity. However, the generator unit should not be limited to direct current. In one embodiment, the generator unit may be in the form of an alternator that generates alternating current electricity. The term "generator" described herein is interchangeable with a direct current or alternating current unit. Similarly, in one embodiment, energy stored in the battery is used to initiate rotation of the rotational element so that it may generate additional energy through rotation thereof. The generated electrical energy may be stored in the associated battery or any electrical energy storage device, including but not limited to a capacitor or any other device with the ability to store or communicate electrical energy to a secondary device, or it may be used to recharge a battery in communication with the integrated unit. Similarly, the bearings shown herein may be replaced by an alternate component that supports rotation of the unit in communication with the magnets with respect to the position of the electrically conductive material. In one embodiment, the unit in communication with the electrically conductive material may rotate in close proximity to the unit in communication with the magnets. With respect to either embodiment, the units should not be considered restricted to the use of bearings to support the rotational movement, as a substitute element may support similar functionality. In addition, in one embodiment, an alternative material may be substituted for the magnets, wherein the alternative material produces electrical energy when placed in proximity to electrically conductive material.

Similarly, the integrated generator units may be employed in various environments where they are exposed to fluid flow. For example, the generator units may be employed in a land vehicle, air vehicle, water based vehicle, etc. The elements described above may be useful for any application wherein a fluid force exerted on a vehicle can be utilized to rotate a rotational element. Fluid flow may come in the form of air flow, water flow, or an alternative fluid source that supports rotation of the rotational elements. In one embodiment, the power generated by the generator units is stored in a battery and used to power a motor to operate a vehicle in communication with the battery. Similarly, in one embodiment, the generated electrical energy may be communicated directly from the generator unit to a motor requiring the electrical energy as an input power source.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Accordingly, the scope of protection of this invention is limited only by the claims and their equivalents.

I claim:

1. An apparatus comprising:
    an enclosure mounted within an interior of an engine compartment of a vehicle and transverse to a front of said vehicle and in communication with fluid flow generated by movement of said vehicle;
    an electro-mechanical generator mounted in said enclosure and in electrical communication with a battery;
    said electro-mechanical generator integrated into a rotational element comprising:
        a rotational element mounted within said enclosure to rotate about an axis upon receipt of said fluid flow in said enclosure;
        a magnet coupled to a distal end of said rotational element to rotate with said rotational element;
        an electrically conductive material spaced about a housing relatively concentric to said rotational element and in communication with said magnet;
        an electrical charge generated from rotation of said rotational element; and
    a connection to communicate said electrical charge to said battery.

2. The apparatus of claim 1, further comprising a first electro-mechanical generator housed in said enclosure adjacent to a second electro-mechanical generator, said first electro-mechanical generator having a first rotational element to rotate in a first rotational direction and said second electro-mechanical generator having a second rotational element adapted to rotate in a second rotational direction, wherein said first and second rotational directions are different.

3. The apparatus of claim 2, further comprising a first fluid force generated by initial movement of said vehicle to cause rotation of said first rotational element, and a second fluid force generated by rotational of said first rotational element to cause rotation of said second rotational element in an opposite direction to said first rotational element.

4. The apparatus of claim 2, further comprising a first battery operatively connected to said first electro-mechanical generator and a second battery operatively connected to said second electro-mechanical generator.

5. The apparatus of claim 1, wherein said electro-mechanical generator is a modular component secured in said enclosure.

6. The apparatus of claim 5, further comprising a visual indicator operatively engaged with each of said modular electro-mechanical generator components to communicate proper operation of said component.

7. The apparatus of claim 6, wherein proper operation of said component includes generating of a minimum electrical charge to said battery operatively engaged with said generator component.

8. The apparatus of claim 5, further comprising modular housing compartments within said enclosure, wherein each of said housing components is sized to receive one of said modular electro-mechanical generator components.

9. The apparatus of claim 8, further comprising replacing one of said generator components with a replacement component absent disruption to a previously installed modular electro-mechanical generator component in said enclosure.

10. The apparatus of claim 9, wherein replacement of one of said modular components is initiated following receipt of a communication that output from said component to said battery is below a threshold of required electrical energy.

11. The apparatus of claim 10, further comprising a control system to monitor electrical output from each of said modular generator components.

12. The apparatus of claim 11, further comprising an output device in communication with said control system to convey failure data of one of said generator components, wherein said output device communication data in a format selected from the group consisting of: visual, auditory, and tactile.

13. The apparatus of claim 1, wherein said electro-mechanical generator is an generator integrated into said rotational element.

14. The apparatus of claim 1, wherein said generated electrical charge recharges said battery.

15. The apparatus of claim 1, wherein said vehicle is selected from the group consisting of: a land vehicle, an air vehicle, and a water based vehicle, and combinations thereof.

16. An apparatus comprising:
an enclosure mounted within an interior of an engine compartment of a vehicle transverse to a front of said vehicle and in communication with a fluid flow generated by movement of said vehicle;
said enclosure having a plurality of interior compartments, with each of said compartments configured to receive and mount a single modular electro-mechanical generator component, said modular electro-mechanical generator component in electrical communication with a battery;
each of said electro-mechanical generator components comprising a generator mounted to a brace and a rotational element in communication with said generator through a shaft;
said rotational element adapted to rotate about an axis upon receipt of said fluid flow in said enclosure;
a first electro-mechanical generator component housed in a first compartment of said enclosure adjacent to a second electro-mechanical generator component housed in an adjacent compartment, said first electro-mechanical generator having a first rotational element adapted to rotate in a first rotational direction and said second electro-mechanical generator having a second rotational element adapted to rotate in a second rotational direction, wherein said first and second rotational directions are different;
an electrical charge generated by each of said generator components through rotation of said rotational elements; and
an electrical connection to communicate said generated electrical charge to said battery.

17. The apparatus of claim 16, further comprising a first fluid force generated by initial movement of said vehicle to cause rotation of said first rotational element, and a second fluid force generated by rotation of said first rotational element to cause rotation of a second rotational element in an opposite direction to said first rotational element.

18. The apparatus of claim 17, wherein said first and second rotational elements are mounted in adjacent compartments of said enclosure.

19. The apparatus of claim 16, wherein said generated electrical charge recharges said battery.

20. The apparatus of claim 16, further comprising a visual indicator operatively engaged with each of said modular electro-mechanical generator components to communicate proper operation of said components.

21. The apparatus of claim 20, wherein proper operation of said component includes generating of a minimum electrical charge to said battery operatively engaged with said generator component.

22. The apparatus of claim 16, wherein said electro-mechanical generator is a modular component secured in said enclosure.

23. The apparatus of claim 22, further comprising modular housing compartments within said enclosure, wherein each of said housing components is sized to receive one of said modular electro-mechanical generator components.

24. The apparatus of claim 23, further comprising replacing one of said generator components with a replacement component absent disruption to previously installed generator component in said enclosure.

25. The apparatus of claim 24, wherein replacement of said component is initiated following receipt of a communication that output from said component to said battery is below a threshold of required electrical output.

26. The apparatus of claim 25, further comprising a control system to monitor electrical output from each of said generator components.

27. The apparatus of claim 26, further comprising an output device in communication with said control system to convey failure data of said generator component, wherein said output device communication data in a format selected from the group consisting of: visual, auditory, and tactile.

28. The apparatus of claim 16, wherein said vehicle is selected from the group consisting of: a land vehicle, an air vehicle, and a water based vehicle, and combinations thereof.

29. An apparatus comprising:
an electro-mechanical generator mounted in a frame and in electrical communication with a battery;
said electro-mechanical generator integrated into a rotational element comprising:
- a first rotational element mounted within said frame to rotate about an axis upon receipt of said fluid flow;
- a plurality of blades in communication with said first rotational element, a proximal end of each of said blades mounted to said first rotational element and a distal end of each of said blades in communication with a second rotational element;
- a magnet housed in said second rotational element;
- said second rotational element to rotate with said first rotational element;
- an electrically conductive material housed in a third element, spaced apart from said second rotational element; and
- an electrical charge generated from rotation of said magnet proximal to said electrically conductive material; and
- an electrical connection to communicate said generated electrical charge to said battery.

30. The apparatus of claim 29, further comprising a motor in communication with said battery, said motor to receive electrical energy from said battery as a power source.

31. The apparatus of claim 29, wherein said third element in a fixed position relative to said first and second rotational elements.

32. The apparatus of claim 31, wherein said third element is concentric with said first and second rotational elements.

33. The apparatus of claim 29, wherein said electrically conductive material is a plurality of units spaced about said third element.

34. The apparatus of claim 33, further comprising a capacitor and rectifier bridge for each of said units.

35. The apparatus of claim 29, wherein said vehicle is selected from the group consisting of: a land vehicle, an air vehicle, and a water based vehicle, and combinations thereof.

* * * * *